(12) United States Patent
Mizuno et al.

(10) Patent No.: US 8,898,005 B2
(45) Date of Patent: Nov. 25, 2014

(54) ON-BOARD APPARATUS

(71) Applicant: Clarion Co., Ltd., Saitama-shi, Saitama (JP)

(72) Inventors: Yoshiyuki Mizuno, Saitama (JP); Keisuke Mutou, Saitama (JP)

(73) Assignee: Clarion Co., Ltd., Saitama-shi (JP)

( * ) Notice: Subject to any disclaimer, the term of this patent is extended or adjusted under 35 U.S.C. 154(b) by 11 days.

(21) Appl. No.: 13/779,009

(22) Filed: Feb. 27, 2013

(65) Prior Publication Data

US 2013/0226447 A1    Aug. 29, 2013

(30) Foreign Application Priority Data

Feb. 28, 2012  (JP) ................................. 2012-041550

(51) Int. Cl.
*G01C 21/32* (2006.01)
*G01C 21/26* (2006.01)

(52) U.S. Cl.
CPC ...................................... *G01C 21/26* (2013.01)
USPC ........................................................ 701/409

(58) Field of Classification Search
None
See application file for complete search history.

(56) References Cited

U.S. PATENT DOCUMENTS

2010/0114474 A1*  5/2010  Suganuma et al. ........... 701/200

FOREIGN PATENT DOCUMENTS

JP         2001-50743 A      2/2001

* cited by examiner

*Primary Examiner* — Thomas Tarcza
*Assistant Examiner* — Garrett Evans
(74) *Attorney, Agent, or Firm* — Crowell & Moring LLP

(57) ABSTRACT

An on-board apparatus includes: a map data storage unit in which map data that include altitude information are stored; a subject vehicle position detection unit that detects a subject vehicle position; and a calculation target geographical point setting unit that sets a calculation target geographical point based upon the subject vehicle position, wherein a road grade at the calculation target geographical point is calculated based upon altitudes of a plurality of geographical points that include at least a geographical point present ahead of the calculation target geographical point and a geographical point present behind the calculation target geographical point.

6 Claims, 7 Drawing Sheets

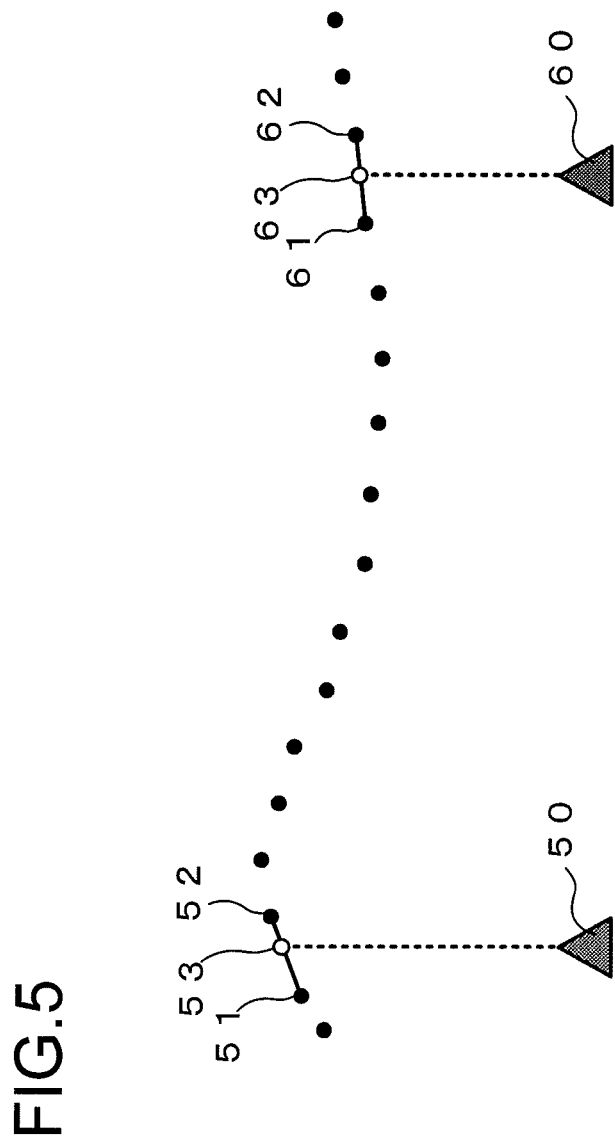

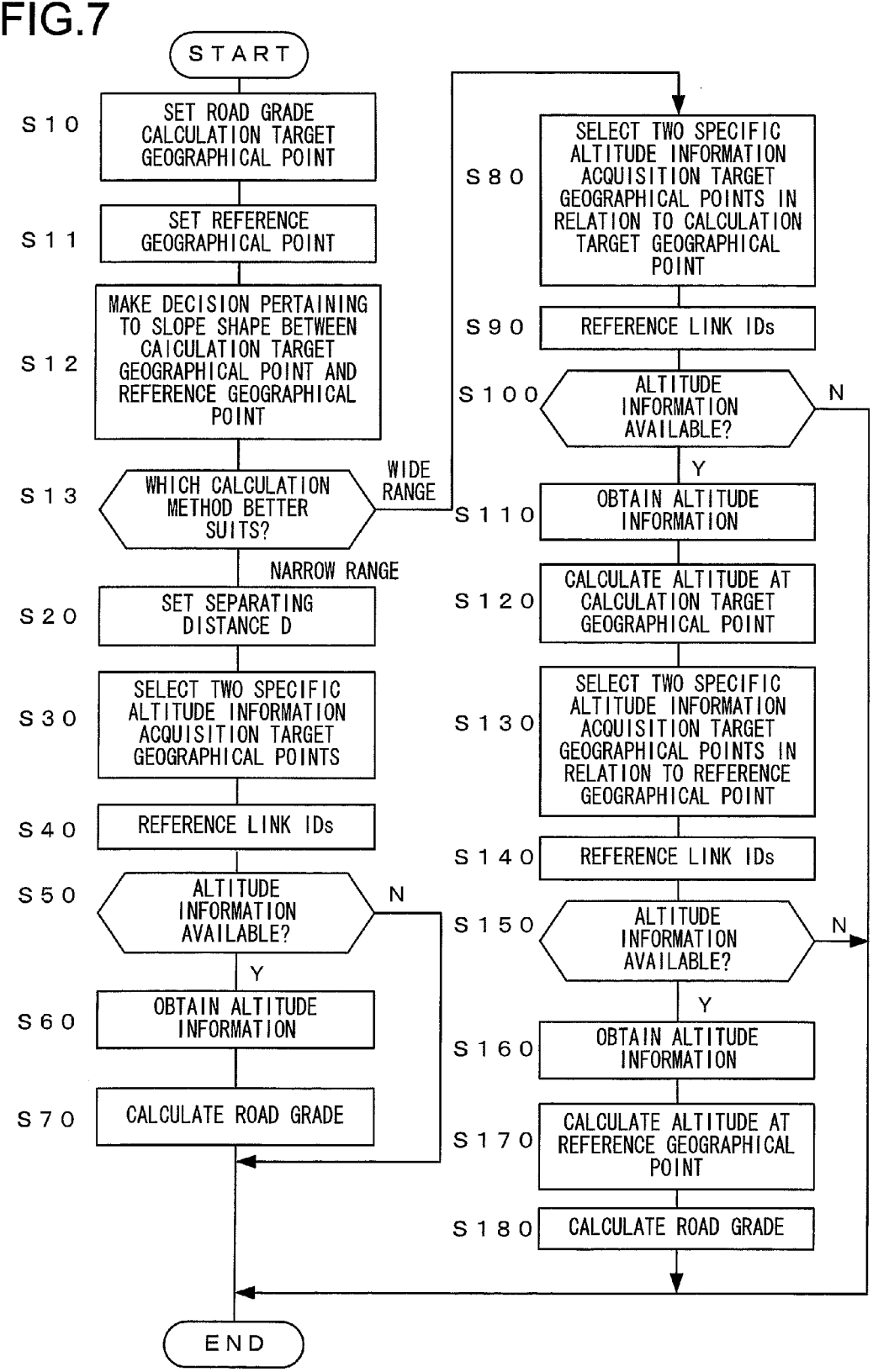

ON-BOARD APPARATUS

INCORPORATION BY REFERENCE

The disclosure of the following priority application is herein incorporated by reference: Japanese Patent Application No. 2012-41550 filed on Feb. 28, 2012.

BACKGROUND OF THE INVENTION

1. Field of the Invention

The present invention relates to an on-board apparatus installed in a vehicle.

2. Description of Related Art

There is an apparatus known in the related art capable of calculating the grade of the road ahead of the subject vehicle based upon sets of mesh altitude data, each stored in correspondence to a specific area among areas set by partitioning a map into mesh areas (see Japanese Laid Open Patent Publication No. 2001-50743). This apparatus calculates the grade of the road ahead of the subject vehicle by setting "virtual" points over predetermined distance intervals along the forward direction on the road upon which the subject vehicle is currently traveling, calculating a grade of the road segment between the current subject vehicle position and each virtual point with using the mesh altitude data of the area where the particular virtual point is located as the altitude data for the virtual points, and then averaging the grades of the road segments thus calculated.

The mesh altitude data used in the apparatus disclosed in patent literature 1 are set in units each corresponding to a predetermined area, e.g., a 10 m×10 m square area. This means that the mesh altitude data stored in correspondence to the mesh area where a given virtual point is located do not necessarily match the actual altitude of the virtual point, giving rise to the distinct possibility that an error in the road grade calculation results will occur. In addition, while an average road grade of the road ahead of the subject vehicle can be calculated by averaging the grades of the road segments between the subject vehicle position and the various virtual points through this method, the road grade at a specific geographical point present ahead of the subject vehicle cannot be calculated.

As a means for addressing the issues of the road grade calculation method in the related art described above, a method of road grade calculation is recently proposed whereby the altitude values at road points in various regions are measured in fine increments and the road grade at a specific geographical point present ahead of the subject vehicle is calculated by using altitude data set based upon the measured values. However, this road grade calculation method, achieved in conjunction with altitude data set in fine increments, is bound to be greatly affected by any error in altitude measurement. For instance, a road grade calculated based upon two sets of altitude data set for two points separated from each other by 1 m with either set of the altitude data manifesting a measurement error of 10 cm will contain ±10% error relative to the percentage value representing the actual road grade. Namely, assuming that the actual road grade is, for instance, 5%, the road grade resulting from the calculation will be off by as much as 15% or −5%, which is vastly different from the actual road grade.

An object of the present invention is to enable accurate calculation of the road grade at a specific geographical point present ahead of the subject vehicle by minimizing the adverse effect attributable to an altitude measurement error occurring as described above.

SUMMARY OF THE INVENTION

An on-board apparatus according to a first aspect of the present invention includes: a map data storage unit in which map data that include altitude information for predetermined geographical points on roads are stored; a subject vehicle position detection unit that detects a subject vehicle position; and a calculation target geographical point setting unit that sets a calculation target geographical point based upon the subject vehicle position. In this on-board apparatus, a road grade at the calculation target geographical point is calculated based upon altitudes of a plurality of geographical points that include at least a geographical point present ahead of the calculation target geographical point and a geographical point present behind the calculation target geographical point.

According to a second aspect of the present invention, the on-board apparatus of the first aspect may further include: an altitude information acquisition unit that obtains altitude information corresponding to two geographical points, one of which is present ahead of the calculation target geographical point and apart from the calculation target geographical point by a predetermined separating distance, the other of which is present behind the calculation target geographical point and apart from the calculation target geographical point by the separating distance, from the map data; and a road grade calculation unit that calculates the road grade at the calculation target geographical point based upon the altitude information obtained by the altitude information acquisition unit.

According to a third aspect of the present invention, the on-board apparatus of the second aspect may further include a separating distance adjusting unit that adjusts the separating distance in correspondence to the calculation target geographical point.

According to a fourth aspect of the present invention, in the on-board apparatus of the third aspect, it is preferred that the separating distance adjusting unit adjusts the separating distance based upon at least any one of a type of area where the calculation target geographical point is located, a road type designation corresponding to the calculation target geographical point, and a type of intersection present ahead of or behind the calculation target geographical point.

According to a fifth aspect of the present invention, the on-board apparatus of any one of the second through fourth aspects may further include: a calculation target geographical point altitude calculation unit that calculates an altitude at the calculation target geographical point based upon altitude information in the map data for two geographical points, one of which is closest ahead of the calculation target geographical point and the other of which is closest behind the calculation target geographical point; a reference geographical point altitude calculation unit that sets a reference geographical point ahead of the calculation target geographical point and apart from the calculation target geographical point by a predetermined distance and calculates an altitude at the reference geographical point based upon altitude information in the map data for two geographical points, one of which is closest ahead of the reference geographical point and the other of which is closest behind the reference geographical point; and a second road grade calculation unit that calculates the road grade at the calculation target geographical point based upon the altitude at the calculation target geographical point calculated by the calculation target geographical point altitude calculation unit and the altitude at the reference geographical point calculated by the reference geographical point altitude calculation unit.

According to a sixth aspect of the present invention, it is preferred that the on-board apparatus of the fifth aspect selects either the road grade calculation unit or the second road grade calculation unit in correspondence to a slope shape of a road segment extending between the calculation target geographical point and the reference geographical point and calculates the road grade at the calculation target geographical point by the selected unit.

According to a seventh aspect of the present invention, the on-board apparatus of the first aspect may further include: a calculation target geographical point altitude calculation unit that calculates an altitude at the calculation target geographical point based upon altitude information in the map data for two geographical points, one of which is closest ahead of the calculation target geographical point and the other of which is closest behind the calculation target geographical point; a reference geographical point altitude calculation unit that sets a reference geographical point ahead of the calculation target geographical point and apart from the calculation target geographical point by a predetermined distance and calculates an altitude at the reference geographical point based upon altitude information in the map data for two geographical points, one of which is closest ahead of the reference geographical point and the other of which is closest behind the reference geographical point; and a road grade calculation unit that calculates the road grade at the calculation target geographical point based upon the altitude at the calculation target geographical point calculated by the calculation target geographical point altitude calculation unit and the altitude at the reference geographical point calculated by the reference geographical point altitude calculation unit.

According to an eighth aspect of the present invention, the on-board apparatus of the seventh aspect may further include: an altitude information acquisition unit that obtains altitude information corresponding to two geographical points, one of which is present ahead of the calculation target geographical point and apart from the calculation target geographical point by a predetermined separating distance, the other of which is present behind the calculation target geographical point and apart from the calculation target geographical point by the separating distance, from the map data; and a second road grade calculation unit that calculates a road grade at the calculation target geographical point based upon the altitude information obtained by the altitude information acquisition unit.

According to a ninth aspect of the present invention, it is preferred that the on-board apparatus of the eighth aspect selects either the road grade calculation unit or the second road grade calculation unit in correspondence to a slope shape of a road segment extending between the calculation target geographical point and the reference geographical point and calculates the road grade at the calculation target geographical point by the selected road unit.

According to the present invention, the road grade at a specific geographical point present ahead of the subject vehicle can be calculated with a high degree of accuracy.

BRIEF DESCRIPTION OF THE DRAWINGS

FIG. 5 illustrates how a road grade over a wide range is calculated.

FIG. 6A presents an example of a situation in which a road grade is better calculated through the narrow-range road grade calculation method, whereas

FIG. 7 presents a flowchart of the road grade calculation processing executed in the navigation apparatus achieved in a second embodiment.

DESCRIPTION OF PREFERRED EMBODIMENTS

First Embodiment

Figure 1:
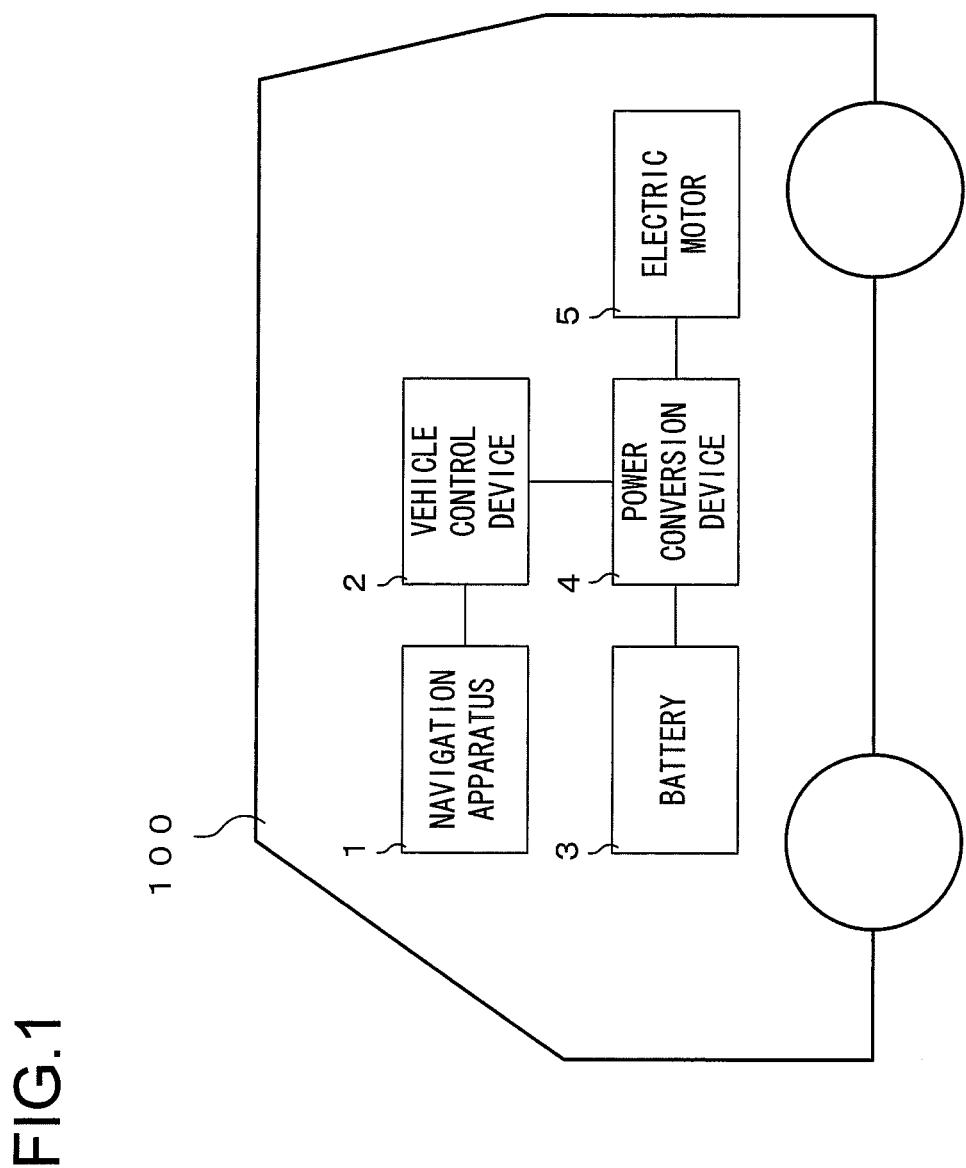
FIG. 1 is a block diagram showing the configuration of an on-board system that includes a navigation apparatus representing an example of the on-board apparatus achieved in an embodiment of the present invention.

The following is a description of the on-board apparatus achieved in an embodiment of the present invention. FIG. 1 is a block diagram showing the configuration of an on-board system that includes a navigation apparatus representing an example of the on-board apparatus achieved in the embodiment of the present invention. FIG. 1 shows that a navigation apparatus 1, a vehicle control device 2, a battery 3, a power conversion device 4 and an electric motor 5 are installed in a vehicle 100, which is an electric vehicle (EV).

The navigation apparatus 1 is able to display a map based upon map data, search for a recommended route to a destination having been set and guide the vehicle 100 to the destination. In addition, it designates a specific geographical point present ahead along the road on which the vehicle 100 is currently traveling as a road grade calculation target geographical point, calculates the road grade at the geographical point and outputs the calculated road grade to the vehicle control device 2. The processing executed by the navigation apparatus 1 in order to calculate the road grade will be described in specific detail later.

The battery 3 provides power used to drive the electric motor 5. The vehicle 100 is able to travel as the electric motor 5 is driven with the power provided from the battery 3. In addition, when the vehicle 100 is in a decelerating state, the electric motor 5 functions as a generator and generates power through regenerative power generation. The power obtained through the regenerative power generation is stored in the battery 3. The power conversion device 4 converts the different types of power exchanged between the battery 3 and the electric motor 5 so that a given type of power is altered to a state usable by the recipient. In more specific terms, the power conversion device 4 converts DC power provided from the battery 3 to AC power and outputs the AC power resulting from the conversion to the electric motor 5, whereas it converts AC power resulting from regenerative power generation at the electric motor 5 to DC power and outputs the DC power resulting from the conversion to the battery 3.

The vehicle control device 2 monitors the road grade calculation results output from the navigation apparatus 1, the traveling conditions of the vehicle 100, the state of the battery 3, the state of the electric motor 5 and the like, and controls the operation of the power conversion device 4 based upon the monitoring results. As the power conversion device 4 is engaged in operation under the control executed by the vehicle control device 2, optimal power exchange between the battery 3 and the electric motor 5 takes place in correspondence to the grade of the road ahead, the traveling conditions of the vehicle 100 and the like. Through this process, the kinetic energy required to move the vehicle 100 can be generated at the electric motor 5 by using the electric energy stored in the battery 3. In addition, electric energy in the form of reusable regenerated energy can be stored in the battery 3 by recovering at least part of the kinetic energy of the moving vehicle 100 via the electric motor 5.

Figure 2:
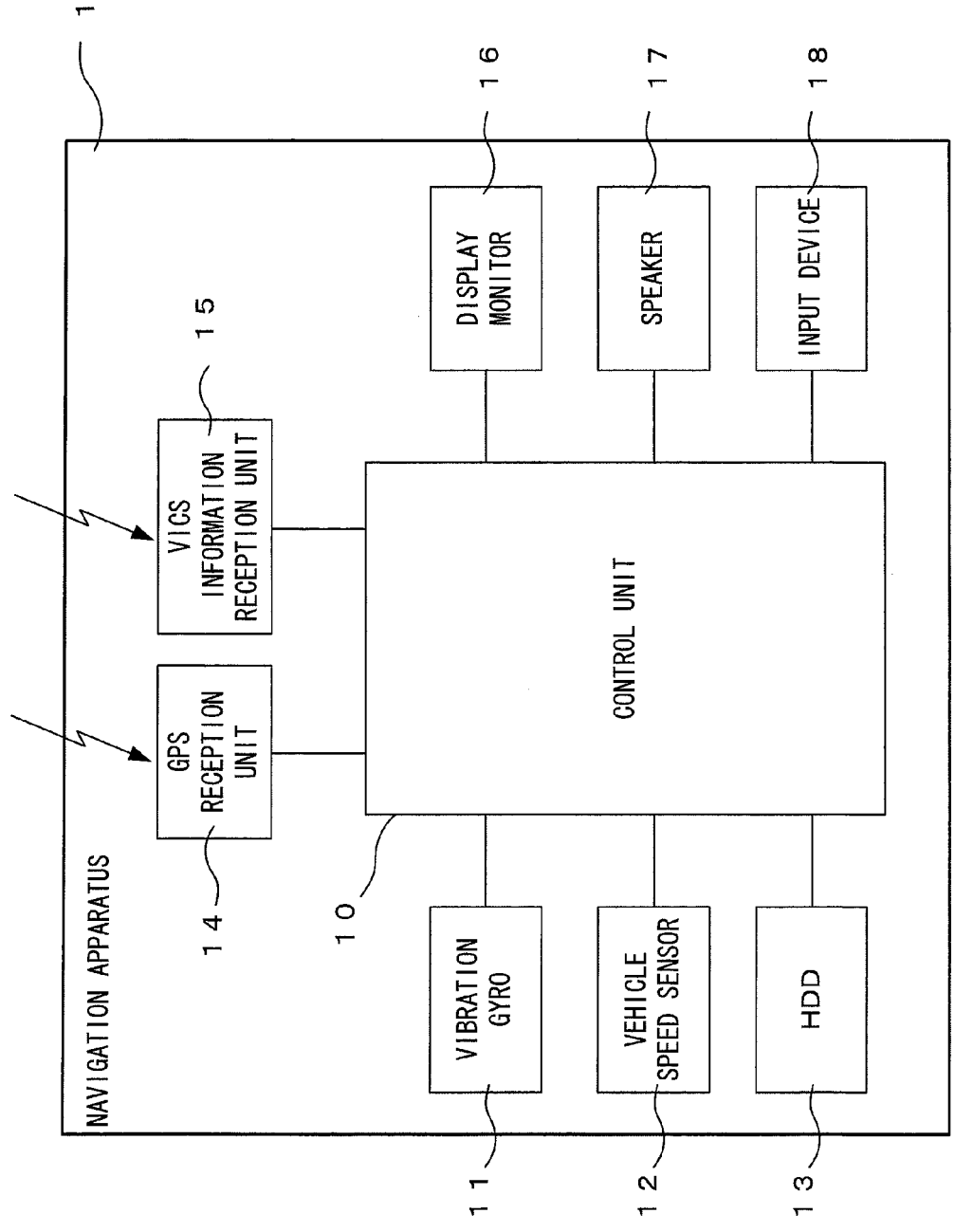
FIG. 2 is a block diagram showing the structure of the navigation apparatus.

FIG. 2 is a block diagram showing the structure of the navigation apparatus 1. The navigation apparatus 1 includes a control unit 10, a vibration gyro 11, a vehicle speed sensor 12, a hard disk drive (HDD) 13, a GPS (Global Positioning System) reception unit 14, a VICS (Vehicle Information and Communication System) information reception unit 15, a display monitor 16, a speaker 17 and an input device 18.

The control unit 10, configured with a microprocessor, various types of peripheral circuits, a RAM, a ROM and the like, executes various types of processing based upon a control program and map data recorded in the HDD 13. The types of processing executed by the control unit 10 include, for instance, destination search processing executed when setting a destination, recommended route search processing executed to determine a recommended route to a selected destination, current position detection processing executed to detect the current position of the vehicle 100, various types of image display processing and sound output processing.

The vibration gyro 11 is a sensor that detects the angular velocity of the vehicle 100. The vehicle speed sensor 12 detects the traveling speed of the vehicle 100. Based upon the state of motion of the vehicle 100 detected via these sensors over predetermined time intervals, the control unit 10 is able to determine the direction along which the vehicle 100 is moving and the extent by which the vehicle 100 has moved.

In the HDD 13, which is a nonvolatile recording medium, the control program enabling the execution of the processing described above by the control unit 10, the map data and the like are recorded. Under control executed by the control unit 10, data recorded in the HDD 13 are read out as necessary to be utilized in various types of processing and control executed by the control unit 10.

The map data recorded in the HDD 13 include route calculation data, road data and background data. The route calculation data are used in a recommended route search executed to determine a recommended route to a destination and the like. The road data express road shapes, road types and the like. The road data express each road by stringing together a plurality of points referred to as nodes or shape interpolation points as will be described in detail later. The background data express objects present in the map background. It is to be noted that objects present in the map background are objects other than roads, present on the map. For instance, rivers, railway tracks, green areas, various types of structures and the like are expressed by the background data.

The term "link" is used to refer to the smallest unit representing a road portion in the map data. Namely, each road is made up with a plurality of links, each corresponding to a predetermined road segment, and the route calculation data and the road data are each expressed in units of individual links. It is to be noted that the two ends of a given link in the road data are each defined by a point referred to as a node in correspondence to which coordinate information is set. In addition, a point referred to as a shape interpolation point is set as necessary in each link. As are the nodes, the shape interpolation points are each appended with coordinate information. The road data express the shape of a road as a line connecting these points in sequence.

For each link corresponding to a specific road segment, a link cost, determined in correspondence to the required driving time expected to elapse while the vehicle 100 travels through the particular road segment and the like, is set in the route calculation data. The navigation apparatus 1 searches for a recommended route by determining a specific combination of links corresponding to preselected route search conditions based upon these link costs. For instance, route search conditions may be selected so that a route is searched by giving top priority to the minimum driving time and in such a case, a specific combination of links achieving the minimum length of travel time from the departure point to the destination will be calculated as a recommended route.

In addition to the various types of data described above, the map data recorded in the HDD 13 further include altitude data. The altitude data indicate the altitudes at various geographical points set in advance on roads. Such map data may be created by using a measuring vehicle equipped with measuring instruments, via which the current position of the traveling vehicle and the altitude at the position can be measured very accurately based upon GPS signals and the like. As this measuring vehicle travels through the country and measures various positions and altitudes along each road over predetermined time intervals or predetermined distance intervals, information indicating the positions and altitudes at individual geographical points present on the roads throughout the nation is collected. Map data created by reflecting the information collected as described above are recorded into the HDD 13 and, as a result, map data that include altitude data are stored into the HDD 13.

It is to be noted that while the map data are recorded in the HDD 13 in the navigation apparatus 1 described above, the present invention is not limited to this example and it may be adopted in conjunction with map data recorded in a recording medium other than an HDD. For instance, the present invention may be adopted in conjunction with map data recorded in a CD-ROM, a DVD-ROM or a memory card. In other words, the data may be stored in any recording medium in the navigation apparatus 1 achieved in the embodiment.

The GPS reception unit 14 receives a GPS signal transmitted from a GPS satellite and outputs the GPS signal thus received to the control unit 10. The GPS signal contains information pertaining to the relative position of the GPS satellite from which the particular GPS signal originated and the transmission time point at which the GPS signal was transmitted. Based upon this information contained in GPS signals originating from a predetermined minimum number of GPS satellites and received via the GPS reception unit 14, the control unit 10 is able to calculate the GPS signal reception position. The results of the reception position calculation executed based upon the GPS signals and the results of the moving direction/moving quantity calculation executed based upon the detection results provided via the vibration gyro 11 and the vehicle speed sensor 12, as described earlier, enable the control unit 10 to detect the subject vehicle position through subject vehicle position detection processing executed over predetermined time intervals.

The VICS information reception unit 15 receives VICS information transmitted from a VICS center (not shown) to the navigation apparatus 1. The VICS information received at the VICS information reception unit 15 provides the navigation apparatus 1 with various types of road traffic information such as congestion information. The VICS information having been received at the VICS information reception unit 15 is output to the control unit 10 and is utilized for congestion information display, recommended route search and the like.

It is to be noted that the VICS center transmits the VICS information to the navigation apparatus 1 through radio wave beacons installed primarily on express highways, through light beacons installed primarily on regular roads or through FM multiplex broadcast. Via a radio wave beacon or a light beacon, VICS information is transmitted on a local scale to vehicles passing through an area in the vicinity of the installation location through a radio wave or light (infrared). In contrast, VICS information can be transmitted over a relatively wide area through FM multiplex broadcast.

The display monitor 16, at which various screens are brought up on display in the navigation apparatus 1, is constituted with, for instance, a liquid crystal display unit. At this display monitor 16, a map screen, a recommended route guidance screen or the like is brought up on display. The specific contents of the screen brought up on display at the display monitor 16 are determined under screen display control executed by the control unit 10. The display monitor 16 is installed at a position easily visible to the user, e.g., on the dashboard or within the instrument panel in the vehicle 100.

Through the speaker 17, various types of audio information are output under control executed by the control unit 10. For instance, audio guidance providing route guidance for the vehicle 100 to the destination along the recommended route, various types of warning sounds and the like are output through the speaker 17.

The input device 18, which provides a user interface enabling the user to perform various types of input operations in order to engage the navigation apparatus 1 in operation, includes various types of input switches. The user is able to enter the name or the like of a facility or a geographical point he wishes to set as a destination, set recommended route search conditions, select a destination among preregistered locations or scroll the map along a desired direction by operating the input device 18. Such an input device 18 may be constituted with an operation panel, a remote control unit or the like. As an alternative, the input device 18 may be integrated with the display monitor 16 in the form of a touch panel.

Once the user sets the destination by operating the input device 18, the navigation apparatus 1 designates the current position of the vehicle 100, detected as explained earlier, as the departure point, and executes route search processing by executing arithmetic processing with a predetermined algorithm based upon the route calculation data described earlier. Through this processing, a search for a recommended route from the departure point to the destination is conducted. In addition, the navigation apparatus 1 displays the recommended route determined through the search in a display mode distinguishable from other roads on the map displayed at the display monitor 16 by, for instance, displaying the recommended route in a different color. Then, it guides the vehicle 100 to the destination by outputting specific image information and audio information via the display monitor 16 and the speaker 17 as the vehicle 100 travels along the recommended route.

Next, the road grade calculation processing executed in the navigation apparatus 1 will be described. As explained earlier, the navigation apparatus 1 sets a road grade calculation target geographical point ahead of the vehicle 100 on the road on which it is currently traveling, calculates the road grade at the particular geographical point and outputs the calculated road grade to the vehicle control device 2. This processing is executed by the control unit 10 by adopting the following calculation method based upon the altitude data included in the map data recorded in the HDD 13.

Figure 3:
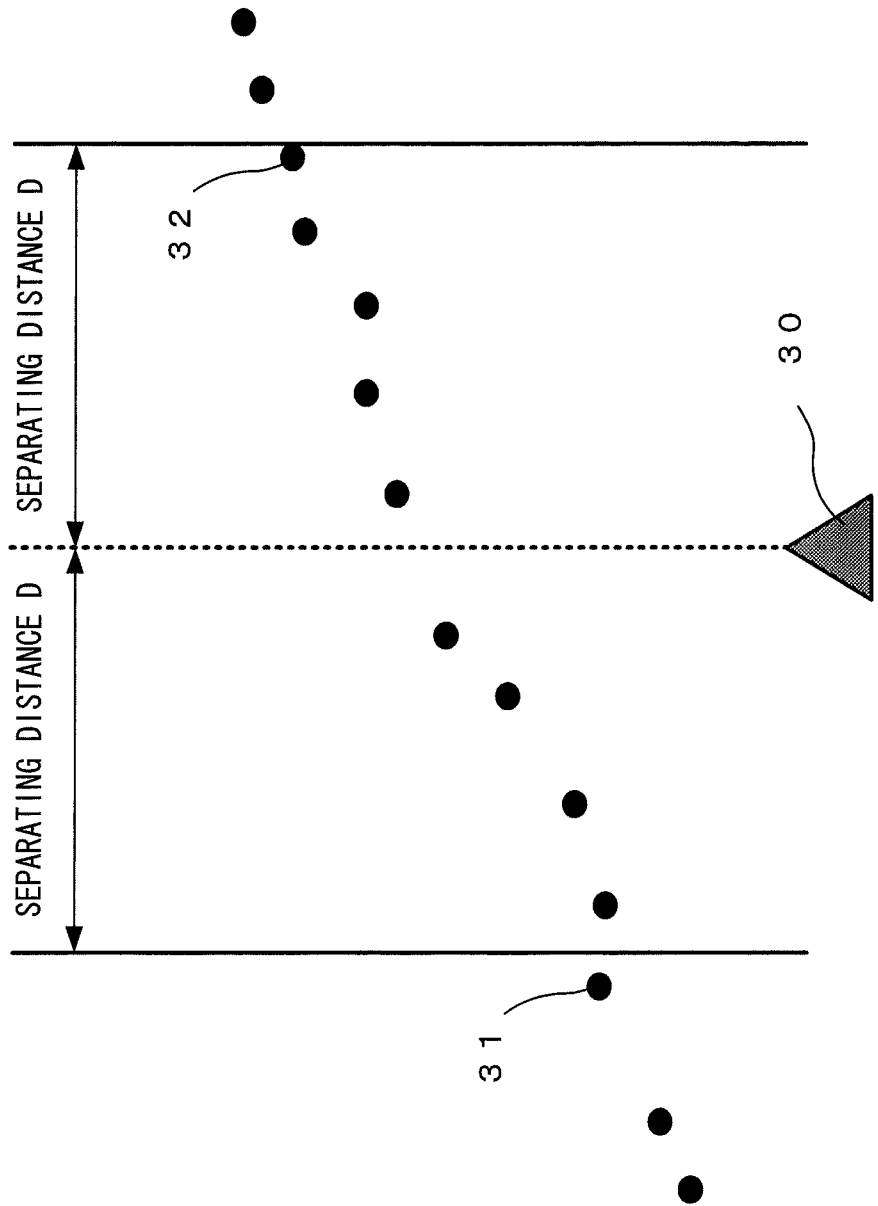
FIG. 3 illustrates how a road grade is calculated.

FIG. 3 illustrates how the road grade is calculated. Reference numeral 30 in FIG. 3 indicates the road grade calculation target geographical point set ahead of the subject vehicle position on the road on which the subject vehicle is traveling. Once the calculation target geographical point 30 is set in correspondence to the subject vehicle position, the navigation apparatus 1 selects two specific geographical points, one present beyond the calculation target geographical point 30 and the other before the calculation target geographical point 30 along the vehicle traveling direction, each set apart from the calculation target geographical point 30 by a predetermined distance D. Next, it obtains altitude information corresponding to the two specific geographical points by selecting altitude data 31 and altitude data 32 indicating the altitudes measured at positions each closest to the respective two specific geographical points among various sets of altitude data (sampled at the various points indicated in FIG. 3) set along the particular road in the map data. It then calculates the altitude difference, i.e., the vertical distance and the positional difference, i.e., the horizontal distance between the geographical point corresponding to the altitude data 31 and the geographical point corresponding to the altitude data 32. Based upon the vertical distance and the horizontal distance thus calculated, the grade of the road segment extending between these two geographical points is calculated and the grade thus calculated is designated as the road grade for the calculation target geographical point 30. Through the processing executed at the control unit 10 by adopting this calculation method, the navigation apparatus 1 is able to calculate the road grade at the calculation target geographical point 30.

It is to be noted that positions taken by the various points along the horizontal direction (the left/right direction in the figure) in FIG. 3 indicate the positional relationships among the individual sets of altitude data on road links. The map data include data indicating the correspondence between links and specific sets of altitude data. By referencing these data, the exact position on a given link at which altitude data are set can be ascertained. In addition, the positions of the various points taken along the vertical direction (the up/down direction in the figure) each indicate the altitude indicated by the corresponding set of altitude data.

Figure 4:
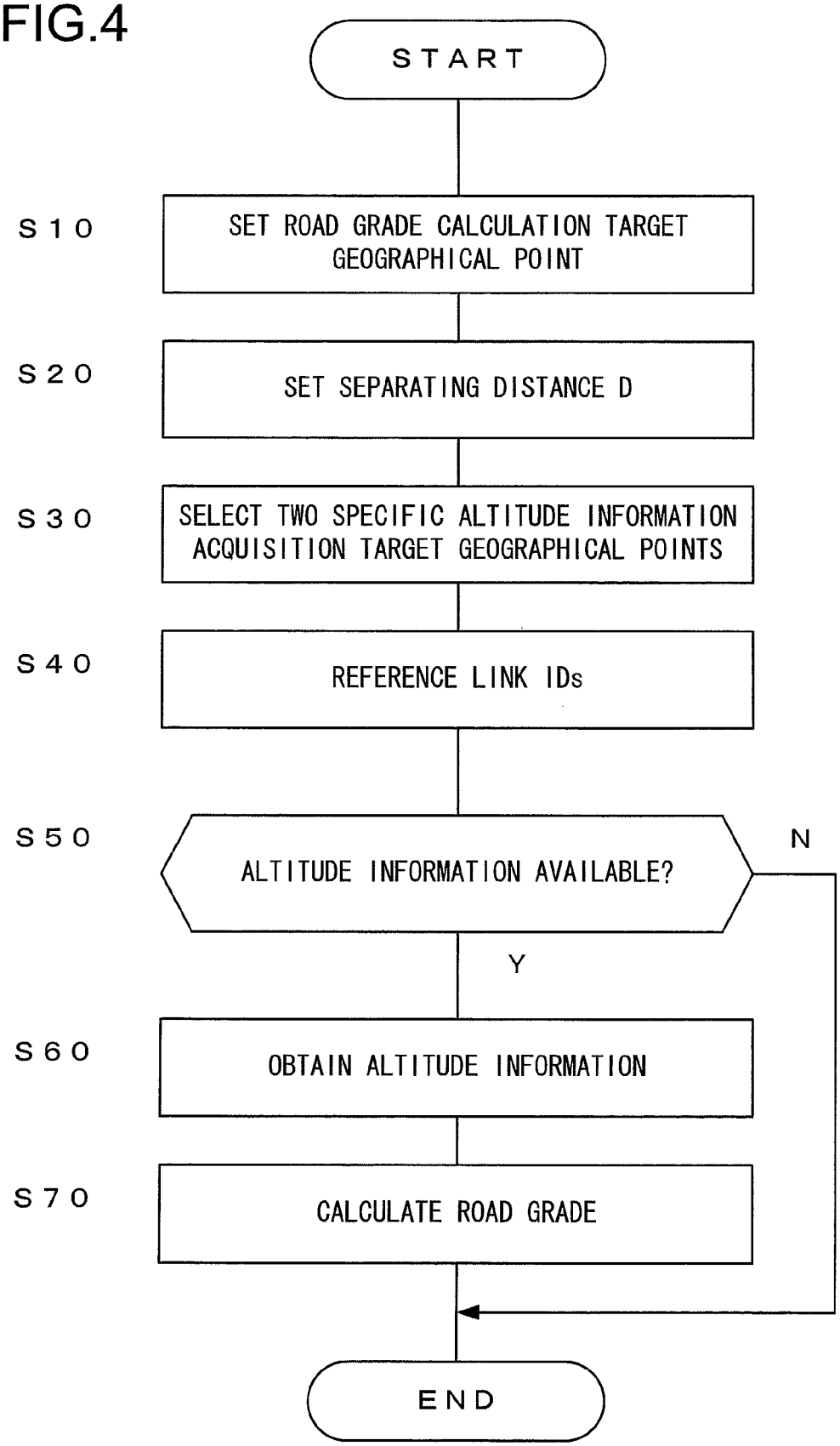
FIG. 4 presents a flowchart of the road grade calculation processing executed in the navigation apparatus achieved in a first embodiment.

FIG. 4 presents a flowchart of the road grade calculation processing executed by the navigation apparatus 1 achieved in the embodiment. The road grade calculation processing is repeatedly executed as shown in the flowchart over predetermined time intervals by the control unit 10 in the navigation apparatus 1.

In step S10, the control unit 10 sets a calculation target geographical point for a road grade. In this example, a geographical point present ahead of the subject vehicle position and set apart from the subject vehicle position by a predetermined distance, e.g., 100 m, along the road that the vehicle 100 is yet to travel is designated as the calculation target geographical point for a road grade. It is to be noted that if a recommended route to a destination is already set at the navigation apparatus 1, the road yet to be traveled by the vehicle 100 is part of the recommended route stretching ahead of the subject vehicle position. If, on the other hand, no recommended route is currently set, the road yet to be traveled by the subject vehicle 100 is the road stretching ahead of the subject vehicle position as the vehicle 100 keeps traveling along the current road.

In step S20, the control unit 10 sets a separating distance D. The separating distance D may be set to a fixed value of, for instance, 50 m. As an alternative, the separating distance D set in step S20 may be adjusted as described below in correspondence to the calculation target geographical point for a road grade set in step S10.

Namely, the separating distance D may be adjusted in correspondence to, for instance, the type of area where the calculation target geographical point is located by setting the separating distance D to a smaller value in, for instance, a mountainous area where the grade is bound to change significantly and setting the separating distance D to a larger value in a flat area where the grade is not expected to change significantly. In this case, area types may be set in advance each in correspondence to a specific mesh in the map data and the type of area where the calculation target geographical point is located can be determined based upon the area type information included in the map data.

As an alternative, the separating distance D may be adjusted based upon the road type designation corresponding to the calculation target geographical point by setting the separating distance D to a smaller value for a road likely to manifest a relatively large extent of grade change, e.g., a narrow urban road, and setting the separating distance D to a larger value for a road where the extent of grade change is likely to be relatively small, e.g., an express highway. In this case, the road type designation can be determined based upon, for instance, attributes of the link corresponding to the calculation target geographical point in the map data. The separating distance may be set in correspondence to the road type designation by also taking into consideration the speed limit, the shape of the link and the like.

Furthermore, the separating distance D may be adjusted in correspondence to the type of intersection present ahead of or behind the calculation target geographical point by setting the separating distance D to a smaller value in an area around an intersection where the grade may change greatly, e.g., at a multilevel crossing, and setting the separating distance D to a larger value in areas around other types of intersections. In this case, the node type designations assigned to the nodes present at the two ends of the link corresponding to the calculation target geographical point in the map data, for instance, may be referenced in order to determine whether or not a multilevel crossing is present at either node.

The separating distance D may be adjusted as explained above by adopting any one of the methods described above or by adopting a plurality of adjusting methods in any combination. In other words, the separating distance D may be adjusted in step S20 based upon at least any one of the type of area where the calculation target geographical point is located, the road type designation corresponding to the calculation target geographical point, and the type of intersection present ahead of or behind the calculation target geographical point.

In step S30, the control unit 10 selects two specific acquisition target geographical points for altitude information in relation to the calculation target geographical point set in step S10 and the separating distance D set in step S20 based upon the map data recorded in the HDD 13. Namely, the two geographical points present ahead of and behind the calculation target geographical point along the road yet to be traveled by the vehicle 100, each set apart from the calculation target geographical point by the separating distance D, are selected as the acquisition target geographical points for altitude information, as has been explained in reference to FIG. 3.

In step S40, the control unit 10 identifies the links corresponding to the two acquisition target geographical points selected in step S30 and references the map data for the inherent link IDs assigned in advance to these links. As a result, the two link IDs each corresponding to one of the acquisition target geographical points are referenced. It is to be noted that if the two acquisition target geographical points are located on a single link, the single link ID corresponding to the particular link alone needs to be referenced.

In step S50, the control unit 10 makes a decision, based upon the link IDs referenced in step S40, as to whether or not the map data include altitude information corresponding to the two acquisition target geographical points selected in step S30. In this step, the data indicating the correspondence between the link on which each of the two acquisition target geographical points is located and altitude data, as described earlier are read out from the map data based upon the link IDs referenced in step S40. Then, based upon the data thus read out, a decision is made as to whether or not at least one set of altitude data is set on the particular link so as to determine whether or not any altitude information is available in correspondence to the link.

If the decision-making results obtained as described above indicate that the map data include altitude information corresponding to both of the two acquisition target geographical points selected in step S30, the operation proceeds to step S60. If, on the other hand, it is decided that the map data do not include altitude information corresponding to at least either of the two acquisition target geographical points, the road grade calculation processing executed as shown in the flowchart presented in FIG. 4 ends. In the latter case, it is desirable that a notice reporting that the road grade could not be calculated be issued to the vehicle control device 2.

In step S60, the control unit 10 obtains the altitude information corresponding to the two acquisition target geographical points selected in step S30 from the map data. In this step, the altitude information corresponding to the two acquisition target geographical points is obtained, as has been explained above using FIG. 3, by reading out altitude data set at the positions each closest to the respective acquisition target geographical points, among sets of altitude data set on the links on which the two acquisition target geographical points are located, from the map data. Through this process, the altitude information sampled at the geographical points closest to the two acquisition target geographical points can be obtained from the map data stored in the HDD 13.

In step S70, the control unit 10 calculates the road grade at the calculation target geographical point set in step S10 based upon the altitude information obtained in step S60. Namely, it calculates the vertical distance and the horizontal distance between the two acquisition target geographical points based upon the altitude data read out in step S60 from the map data in correspondence to the two acquisition target geographical points. Then, it calculates the grade of the road segment extending between the two acquisition target geographical points as a percentage value representing the ratio of the vertical distance to the horizontal distance, and designates the grade thus calculated as the road grade at the calculation target geographical point. The road grade at the calculation target geographical point is thus calculated.

Once the processing in step S70 is executed, the control unit 10 ends the road grade calculation processing in the flowchart presented in FIG. 4. It then outputs the calculated road grade to the vehicle control device 2.

Advantages are achieved as described in (1) and (2) below through the first embodiment of the present invention described above.

(1) At the navigation apparatus 1, map data that include altitude information indicating the altitudes at various geographical points on roads set in advance are stored in the HDD 13 and the control unit 10 executes processing for detecting the subject vehicle position. In the road grade calculation processing executed by the control unit 10, a calculation target geographical point for a road grade is set based upon the detected subject vehicle position (step S10), two specific acquisition target geographical points, one present ahead of and the other behind the calculation target geographical point, each set apart from the calculation target geographical point by a predetermined separating distance D, are selected (step S30), and altitude information corresponding to these two geographical points is obtained from the map data (step S60). Then, based upon the altitude information thus obtained, the road grade at the calculation target geographical point is calculated (step S70). Through these steps, the road grade at a specific geographical point present ahead of the subject vehicle can be calculated with accuracy by minimizing any adverse effect attributable to altitude measurement error.

(2) The control unit 10 is able to adjust the separating distance D (step S20) in correspondence to the calculation target geographical point set in step S10. In more specific terms, the separating distance D can be adjusted based upon at least any one of the type of area where the calculation target geographical point is located, the road type designation corresponding to the calculation target geographical point, and the type of intersection present ahead of or behind the calculation target geographical point. As a result, the road grade can be calculated by optimizing the separating distance in correspondence to the located situation of the calculation target geographical point.

Second Embodiment

Next, the second embodiment of the present invention will be described. The on-board apparatus achieved in this embodiment as described below is capable of determining a road grade through another calculation method as well as through the road grade calculation method explained in reference to the first embodiment. It is to be noted that as is the first embodiment, the second embodiment will be described by assuming that the present invention is adopted in a navigation apparatus. The configuration of the on-board system and the structure of the navigation apparatus 1 achieved in the embodiment are identical to those shown in FIG. 1 and FIG. 2 respectively.

The navigation apparatus 1 in the embodiment calculates a road grade over a relatively small range through the calculation method described in reference to the first embodiment. In addition, it calculates a road grade over a relatively wide range by adopting another calculation method. It is able to calculate the road grade in an optimal manner by selectively using either of the two different calculation methods that better suits a given set of circumstances. It is to be noted that the former calculation method will be referred to as a "narrow-range road grade calculation method" and the latter calculation method will be referred to as a "wide-range road grade calculation method" in the following description.

FIG. 5 illustrates the wide-range road grade calculation method. Reference numeral 50 in FIG. 5 indicates the road grade calculation target geographical point set on the road ahead of the subject vehicle, as does reference numeral 30 in FIG. 3. Reference numeral 60 indicates a geographical point ahead of the calculation target geographical point 50, which is set apart from the calculation target geographical point 50 by a predetermined distance, e.g., by 500 m. In the following description, the geographical point indicated by reference numeral 60 will be referred to as a reference geographical point. It is to be noted that as do the positions of the various points in FIG. 3, the positions of the various points taken along the horizontal direction (the left/right direction in the figure) and along the vertical direction (the up/down in the figure) in FIG. 5 respectively indicate the positional relationships among the individual sets of altitude data on road links and the altitudes at the corresponding points.

Upon setting the calculation target geographical point 50 in relation to the subject vehicle position, the navigation apparatus 1 sets the reference geographical point 60 at a geographical point present ahead of the calculation target geographical point 50, which is set apart from the calculation target geographical point 50 by the predetermined distance along the road yet to be traveled by the vehicle 100. Next, it selects altitude data 51 and altitude data 52 sampled at positions, one of which is closest ahead of the calculation target geographical point 50 and the other of which is closest behind the calculation target geographical point 50, among the various sets of altitude data (sampled at the points shown in FIG. 5) set on the road in the map data, and calculates a value for altitude data 53 corresponding to the calculation target geographical point 50 by using the selected altitude data. Namely, the navigation apparatus 1 determines the value for the altitude data 53 corresponding to the calculation target geographical point 50 through weighted averaging of the altitude values indicated by the two sets of altitude data 51 and 52, which is executed by weighting the two altitude values in correspondence to the distance from the calculation target geographical point 50 to the geographical point corresponding to the altitude data 51 and the distance from the calculation target geographical point 50 to the geographical point corresponding to the altitude data 52. Likewise, the navigation apparatus 1 selects altitude data 61 and altitude data 62 sampled at positions, one of which is closest ahead of the reference geographical point 60 and the other of which is closest behind the reference geographical point 60, and calculates a value for altitude data 63 corresponding to the reference geographical point 60 by using these altitude data.

The navigation apparatus 1 calculates the altitude difference, i.e., the vertical distance, between the calculation target geographical point 50 and the reference geographical point 60 based upon the value for the altitude data 53 corresponding to the calculation target geographical point 50 and the value for the altitude data 63 corresponding to the reference geographical point 60 having been calculated as described above. It then calculates the grade of the road segment between the calculation target geographical point 50 and the reference geographical point 60 based upon the vertical distance having been calculated and the distance from the calculation target geographical point 50 to the reference geographical point 60, and designates the calculated grade as the road grade at the calculation target geographical point 50. As the control unit 10 executes processing corresponding to this calculation method, the road grade at the calculation target geographical point 50 is calculated in the navigation apparatus 1.

Figure 6A:
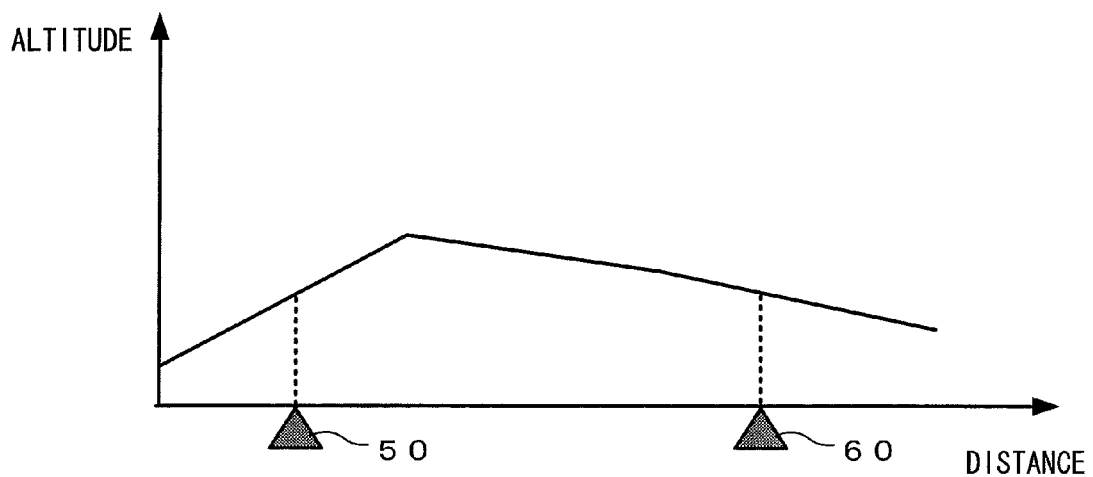
Figure 6B:
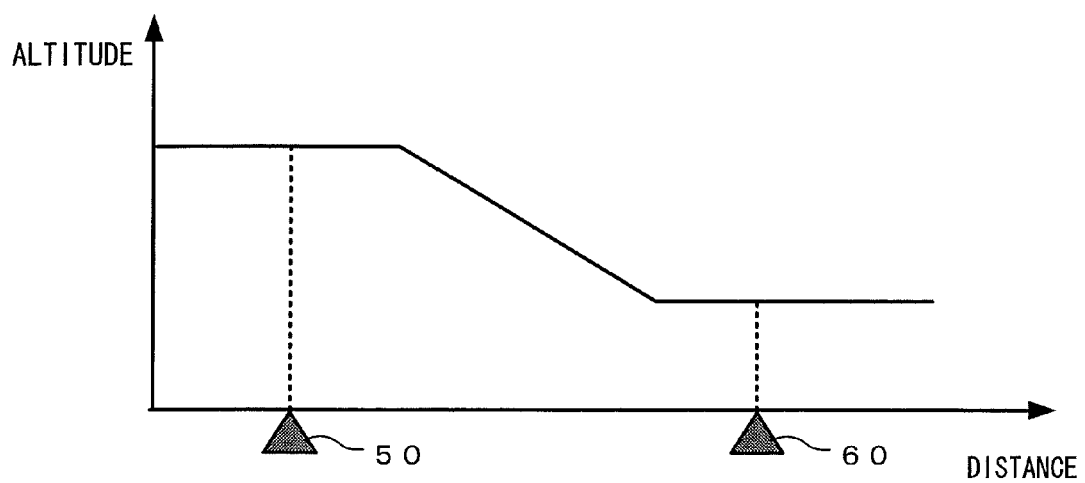
FIG. 6B presents an example of a situation in which a road grade is better calculated through the wide-range road grade calculation method.

The navigation apparatus 1 selectively uses the narrow-range road grade calculation method described in reference to the first embodiment or the wide-range road grade calculation method described above in correspondence to the current conditions. FIGS. 6A and 6B, in reference to which the selective use of either road grade calculation method appropriate for the current conditions is to be described, respectively present an example of a situation in which the road grade is better calculated through the narrow-range road grade calculation method and an example of a situation in which the road grade is better calculated through the wide-range road grade calculation method.

FIG. 6A presents an example of a situation better suited to the narrow-range road grade calculation method. The figure indicates that the altitude changes in the vicinity of the calculation target geographical point 50 and that the altitude difference manifesting between the calculation target geographical point 50 and the reference geographical point 60 is small. Under these circumstances, a road grade smaller than the actual road grade will be calculated for the calculation target geographical point 50 through the wide-range road grade calculation method described in reference to FIG. 5. Accordingly, it is more desirable, in this situation, to calculate the road grade at the calculation target geographical point 50 by adopting the narrow-range road grade calculation method described earlier in reference to FIG. 3.

FIG. 6B presents an example of a situation better suited to the wide-range road grade calculation method. The figure indicates that the altitude does not change much, if any, in the vicinity of the calculation target geographical point 50 and that the altitude difference manifesting between the calculation target geographical point 50 and the reference geographical point 60 is significant. Under these circumstances, a road grade smaller than the actual road grade will be calculated for the calculation target geographical point 50 through the narrow-range road grade calculation method described in reference to FIG. 3. Accordingly, it is more desirable in this case to calculate the road grade at the calculation target geographical point 50 by adopting the wide-range road grade calculation having been described in reference to FIG. 5.

The navigation apparatus 1 makes a decision as to whether the shape of the slope of the road extending between the calculation target geographical point 50 and the reference geographical point 60 is closer to the case indicated in FIG. 6A or the case indicated in FIG. 6B based upon any change occurring in the altitude in the vicinity of the calculation target geographical point 50, the altitude difference between the calculation target geographical point 50 and the reference geographical point 60, and the like. Then, based upon the decision-making results, it selects either the narrow-range road grade calculation method or the wide-range road grade calculation method and calculates the road grade for the calculation target geographical point 50 through the selected calculation method.

FIG. 7 presents a flowchart of the road grade calculation processing executed by the navigation apparatus 1 achieved in the embodiment. The road grade calculation processing is repeatedly executed as shown in the flowchart over predetermined time intervals by the control unit 10 in the navigation apparatus 1. It is to be noted that processing steps in FIG. 7, in which processing identical to the road grade calculation processing in the first embodiment having been described in reference to FIG. 4 is executed, are assigned with the same step numbers as those in FIG. 4. Unless it is deemed necessary, the processing executed in the processing steps bearing the same step numbers as those in FIG. 4 will not be explained in the following description.

In step S11, the control unit 10 sets the reference geographical point in relation to the calculation target geographical point for a road grade set in step S10. In this step, a geographical point present ahead of the calculation target geographical point for a road grade along the road yet to be traveled by the vehicle 100, which is set apart from the calculation target geographical point by a predetermined distance of, for instance, 500 m is set as the reference geographical point. It is to be noted that if a recommended route to a destination is already set at the navigation apparatus 1, the road yet to be traveled by the vehicle 100 is part of the recommended route extending from the subject vehicle position, passing through the calculation target geographical point and stretching further ahead. If, on the other hand, no recommended route is currently set, the road yet to be traveled by the subject vehicle 100 is the road extending from the subject vehicle position, passing through the calculation target geographical point and stretching further ahead as the vehicle 100 keeps traveling along the current road.

In step S12, the control unit 10 determines the shape of the slope of the road extending between the calculation target geographical point for a road grade set in step S10 and the reference geographical point set in step S11. In this step, the control unit 10 makes a decision, based upon any change in the altitude in the vicinity of the calculation target geographical point, the altitude difference between the calculation target geographical point and the reference geographical point, and the like, as to whether the shape of the slope of the road extending between the calculation target geographical point and the reference geographical point is similar to the case indicated in FIG. 6A or the case indicated in FIG. 6B.

In step S13, the control unit 10 makes a decision based upon the results of the decision made in step S12 as to whether the narrow-range road grade calculation method or the wide-range road grade calculation method better suits the current situation. Namely, if it is decided in step S12 that the shape of the slope of the road extending between the calculation target geographical point and the reference geographical point resembles the case indicated in FIG. 6A, the control unit 10 decides that the narrow-range road grade calculation method better suits the current situation and the operation proceeds to step S20. If, on the other hand, it is decided in step S12 that the shape of the slope of the road extending between the calculation target geographical point and the reference geographical point resembles the case indicated in FIG. 6B, the control unit 10 decides that the wide-range road grade calculation method better suits the current situation and the operation proceeds to step S80.

Upon proceeding to step S20 from step S13, the control unit 10 executes processing similar to that described in reference to the flowchart presented in FIG. 4 through steps S20 through S70. Through this processing, the road grade at the calculation target geographical point set in step S10 is calculated by adopting the narrow-range road grade calculation method. Once the processing in step S70 is executed, the control unit 10 ends the road grade calculation processing in the flowchart presented in FIG. 7 and outputs the calculated road grade to the vehicle control device 2.

Upon proceeding to step S80 from step S13, the control unit 10 selects in step S80 two specific acquisition target geographical points for altitude information in correspondence to the calculation target geographical point for a road grade set in step S10. In this step, two geographical points, one of which is closest ahead of the calculation target geographical point and the other of which is closest behind the calculation target geographical point among various geographical points each corresponding to a set of altitude data set on the road the subject vehicle is currently traveling on in the map data, are selected as the acquisition target geographical points for altitude information in relation to the calculation target geographical point, as described in FIG. 5.

In step S90, the control unit 10 identifies the links corresponding to the two acquisition target geographical points selected in step S80 and references the map data for the inherent link IDs assigned in advance to these links. As a result, the two link IDs each corresponding to one of the acquisition target geographical points are referenced. It is to be noted that if the two acquisition target geographical points are located on a single link, a single link ID corresponding to the particular link alone needs to be referenced.

In step S100, the control unit 10 makes a decision, based upon the link IDs referenced in step S90, as to whether or not the map data include altitude information corresponding to the two acquisition target geographical points selected in step S80. In this step, a decision similar to that made in step S50 described in reference to the flowchart presented in FIG. 4 is made. Namely, the data indicating the correspondence between the link on which each of the two acquisition target geographical points is located, and altitude data, as described earlier, are read out from the map data based upon the link IDs referenced in step S90. Then, based upon the data thus read out, a decision is made as to whether or not at least one set of altitude data is set on the particular link so as to determine whether or not any altitude information is available in correspondence to the link.

If the decision-making results obtained as described above indicate that the map data include altitude information corresponding to both of the two acquisition target geographical points selected in step S80, the operation proceeds to step S110. If, on the other hand, it is decided that the map data do not include altitude information corresponding to at least either of the two acquisition target geographical points, the road grade calculation processing executed as shown in the flowchart presented in FIG. 7 ends. In the latter case, it is desirable that a notice reporting that the road grade could not be calculated be issued to the vehicle control device 2.

In step S110, the control unit 10 obtains the altitude information corresponding to the two acquisition target geographical points selected in step S80 from the map data. Namely, the control unit 10 obtains the altitude information by reading out the sets of altitude data set in correspondence to the two acquisition target geographical points from the map data stored in the HDD 13.

In step S120, the control unit 10 calculates the altitude at the calculation target geographical point set in step S10 based upon the altitude information obtained in step S110. In this step, a weighted average of the altitude values indicated in the individual sets of altitude data having been read out in step S110 is calculated by weighting each of the altitude values in correspondence to the distance from the calculation target geographical point to the geographical point corresponding to the altitude value, i.e., the acquisition target geographical point selected in step S80, as explained earlier in reference to FIG. 5. In other words, the altitude at the calculation target geographical point is calculated as the weighted average.

In step S130, the control unit 10 selects two specific acquisition target geographical points for altitude information in relation to the reference geographical point set in step S11. In this step, two geographical points, one of which is closest ahead of the reference geographical point and the other of which is closest behind the reference geographical point among various geographical points each corresponding to a set of altitude data set on the road the subject vehicle is currently traveling on in the map data, are selected as the acquisition target geographical points for altitude information in relation to the reference geographical point, as has been explained in reference to FIG. 5.

In step S140, the control unit 10 identifies the links corresponding to the two acquisition target geographical points selected in step S130 and references the map data for the inherent link IDs assigned in advance to these links. As a result, the two link IDs each corresponding to one of the acquisition target geographical points are referenced. It is to be noted that if the two acquisition target geographical points are located on a single link, the single link ID corresponding to the particular link alone needs to be referenced. In addition, if such link IDs have already been referenced in step S90 described earlier, the processing in step S140 may be skipped.

In step S150, the control unit 10 makes a decision, based upon the link IDs referenced in step S140, as to whether or not the map data include altitude information corresponding to the two acquisition target geographical points selected in step S130. In this step, the decision as to whether or not altitude information is available is made through a decision-making method similar to that used in steps S50 and S100.

If the decision-making results obtained as described above indicate that the map data include altitude information corresponding to both of the two acquisition target geographical points selected in step S130, the operation proceeds to step S160. If, on the other hand, it is decided that the map data do not include altitude information corresponding to at least either of the two acquisition target geographical points, the road grade calculation processing executed as shown in the flowchart presented in FIG. 7 ends. In the latter case, it is desirable that a notice reporting that the road grade could not be calculated be issued to the vehicle control device 2.

In step S160, the control unit 10 obtains the altitude information corresponding to the two acquisition target geographical points selected in step S130 from the map data. Namely, the control unit 10 obtains the altitude information by reading out the sets of altitude data set in correspondence to the two acquisition target geographical points from the map data stored in the HDD 13.

In step S170, the control unit 10 calculates the altitude at the reference geographical point set in step S11 based upon the altitude information obtained in step S160. In this step, a weighted average of the altitude values indicated in the individual sets of altitude data having been read out in step S160 is calculated in a similar manner to step S120. Namely, it is calculated by weighting each of the altitude values fin correspondence to the distance from the reference geographical point to the geographical point corresponding to the altitude value, i.e., the acquisition target geographical point selected in step S130. In other words, the altitude at the reference geographical point is calculated as the weighted average.

In step S180, the control unit calculates the road grade at the calculation target geographical point set in step S10 based upon the altitude at the calculation target geographical point calculated in step S120 and the altitude at the reference geographical point calculated in step S170. Namely, it determines the vertical distance between these two geographical points based upon the altitude at the calculation target geographical point and the altitude at the reference geographical point, as has been explained earlier. Then, it calculates the grade of the road segment extending between the calculation target geographical point and the reference geographical point as a percentage value representing the ratio of the vertical distance to the specific distance between the calculation target geographical point and the reference geographical point and designates the grade thus calculated as the road grade at the calculation target geographical point. Through this process, the road grade at the calculation target geographical point is calculated.

Once the processing in step S180 is executed, the control unit 10 ends the road grade calculation processing in the flowchart presented in FIG. 7. It then outputs the calculated road grade to the vehicle control device 2.

The second embodiment of the present invention described above achieves advantages (3) and (4) described below in addition to the advantages (1) and (2) described in reference to the first embodiment.

(3) In the road grade calculation processing executed by the control unit 10, a calculation target geographical point for a road grade is set at the navigation apparatus 1 based upon the detected subject vehicle position (step S10). Then, two specific acquisition target geographical points, one of which is closest ahead of the calculation target geographical point and the other of which is closest behind the calculation target geographical point, are selected in the map data stored in the HDD 13 (step S80), and altitude information corresponding to these two geographical points is obtained from the map data (step S110). The altitude at the calculation target geographical point is calculated based upon the altitude information thus obtained (step S120). In addition, a reference geographical point is set (step S11) ahead of the calculation target geographical point and apart from the calculation target geographical point by a predetermined distance. Then, two specific acquisition target geographical points, one of which is closest ahead of the reference geographical point and the other of which is closest behind the reference geographical point, are selected in the map data stored in the HDD 13 (step S130), and altitude information corresponding to these two geographical points is obtained from the map data (step S160). The altitude at the reference geographical point is calculated based upon the altitude information thus obtained (step S170). Once the altitude at the calculation target geographical point and the altitude at the reference geographical point are calculated as described above, the road grade at the calculation target geographical point is calculated based upon these altitudes (step S180). Through these steps, the road grade at a specific geographical point present ahead of the subject vehicle can be calculated with accuracy by minimizing any adverse effect attributable to altitude measurement error, as in the first embodiment.

(4) The control unit 10 makes a decision (step S12) pertaining to the shape of the slope of the road extending between the calculation target geographical point set in step S10 and the reference geographical point set in step S11, and selects (step S13), in correspondence to the decision-making results, ether the processing in steps S20 through S70 executed by adopting the narrow-range road grade calculation method or the processing in steps S80 through S180 executed by adopting the wide-range road grade calculation method. Through the specific processing flow thus selected, the road grade at the calculation target geographical point is calculated. As a result, the road grade can be calculated through the optimal calculation method, i.e., either of the two different calculation methods selected in correspondence to the particulars of the current conditions.

It is to be noted that in the second embodiment described above, either the processing executed in steps S20 through S70, by adopting the narrow-range road grade calculation method, or the processing executed in steps S80 through S180, by adopting the wide-range road grade calculation method, is selected in step S13, based upon the decision-making results obtained in step S12. However, the present invention is not limited to this example and the processing in steps S12 and S13 and the processing in steps S20 through S70 may be omitted. In other words, the present invention may be exclusively adopted in conjunction with the wide-range road grade calculation method, i.e., the processing executed in steps S80 through S180, and even in such a case, the road grade at a specific geographical point present ahead of the subject vehicle can be calculated with great accuracy while minimizing the adverse effect of any error in altitude measurement.

While the present invention is adopted in the navigation apparatus 1 installed in the vehicle 100, which is an electric vehicle (EV) in the embodiments described above, the present invention is not limited to this example and it may be adopted in a navigation apparatus 1 installed in a vehicle other than an EV. Namely, the present invention may be adopted in an apparatus installed in another type of vehicle, such as an HEV or a conventional vehicle in which motive power is generated by driving an internal combustion engine with fuel such as gasoline.

In addition, while the present invention is adopted in the navigation apparatus 1 in the embodiments described above, the present invention is not limited to this example and it may be adopted in an on-board apparatus other than a navigation apparatus. Namely, the present invention may be adopted in any on-board apparatus capable of setting a calculation target geographical point for a road grade and calculating a road grade at the calculation target geographical point.

In the wide-range road grade calculation method described in reference to the second embodiment, the weighted average calculated by weighting the values indicated by the two sets of altitude data sampled at the two geographical points, one of which is closest ahead of the calculation target geographical point and the other of which is closest behind the calculation target geographical point, is designated as the altitude data value for the calculation target geographical point. As an alternative, the value indicated by the altitude data sampled at the single position closest to the calculation target geographical point may be used as the altitude data value for the calculation target geographical point. In addition, the value indicated by the altitude data sampled at the single position closest to the reference geographical point may likewise be used as the altitude data value for the reference geographical point.

It is to be noted that the various embodiments and variations thereof described above are examples and that as long as the features characterizing the present invention remain intact, the present invention is in no way limited to the particulars of these examples.

What is claimed is:

1. An on-board apparatus, comprising:
   a map data storage unit in which map data that include altitude information for predetermined geographical points on roads are stored;
   a subject vehicle position detection unit that detects a subject vehicle position;
   a calculation target geographical point setting unit that sets a calculation target geographical point based upon the subject vehicle position;
   an altitude information acquisition unit that obtains altitude information corresponding to two geographical points, one of which is present ahead of the calculation target geographical point and apart from the calculation target geographical point by a predetermined separating distance, the other of which is present behind the calculation target geographical point and apart from the calculation target geographical point by the separating distance, from the map data;
   a road grade calculation unit that calculates the road grade at the calculation target geographical point based upon the altitude information obtained by the altitude information acquisition unit; and
   a separating distance adjusting unit that adjusts the separating distance in correspondence to the calculation target geographical point, wherein:
   the separating distance adjusting unit adjusts the separating distance based upon at least any one of a type of area where the calculation target geographical point is located, a road type designation corresponding to the calculation target geographical point, and a type of intersection present ahead of or behind the calculation target geographical point.

2. An on-board apparatus, comprising:
a map data storage unit in which map data that include altitude information for predetermined geographical points on roads are stored;
a subject vehicle position detection unit that detects a subject vehicle position;
a calculation target geographical point setting unit that sets a calculation target geographical point based upon the subject vehicle position;
an altitude information acquisition unit that obtains altitude information corresponding to two geographical points, one of which is present ahead of the calculation target geographical point and apart from the calculation target geographical point by a predetermined separating distance, the other of which is present behind the calculation target geographical point and apart from the calculation target geographical point by the separating distance, from the map data;
a road grade calculation unit that calculates the road grade at the calculation target geographical point based upon the altitude information obtained by the altitude information acquisition unit;
a calculation target geographical point altitude calculation unit that calculates an altitude at the calculation target geographical point based upon altitude information in the map data for two geographical points, one of which is closest ahead of the calculation target geographical point and the other of which is closest behind the calculation target geographical point;
a reference geographical point altitude calculation unit that sets a reference geographical point ahead of the calculation target geographical point and apart from the calculation target geographical point by a predetermined distance and calculates an altitude at the reference geographical point based upon altitude information in the map data for two geographical points, one of which is closest ahead of the reference geographical point and the other of which is closest behind the reference geographical point; and
a second road grade calculation unit that calculates the road grade at the calculation target geographical point based upon the altitude at the calculation target geographical point calculated by the calculation target geographical point altitude calculation unit and the altitude at the reference geographical point calculated by the reference geographical point altitude calculation unit.

3. An on-board apparatus according to claim 2, wherein:
the on-board apparatus selects either the road grade calculation unit or the second road grade calculation unit in correspondence to a slope shape of a road segment extending between the calculation target geographical point and the reference geographical point and calculates the road grade at the calculation target geographical point by the selected unit.

4. An on-board apparatus, comprising:
a map data storage unit in which map data that include altitude information for predetermined geographical points on roads are stored;
a subject vehicle position detection unit that detects a subject vehicle position;
a calculation target geographical point setting unit that sets a calculation target geographical point based upon the subject vehicle position;
a calculation target geographical point altitude calculation unit that calculates an altitude at the calculation target geographical point based upon altitude information in the map data for two geographical points, one of which is closest ahead of the calculation target geographical point and the other of which is closest behind the calculation target geographical point;
a reference geographical point altitude calculation unit that sets a reference geographical point ahead of the calculation target geographical point and apart from the calculation target geographical point by a predetermined distance and calculates an altitude at the reference geographical point based upon altitude information in the map data for two geographical points, one of which is closest ahead of the reference geographical point and the other of which is closest behind the reference geographical point; and
a road grade calculation unit that calculates the road grade at the calculation target geographical point based upon the altitude at the calculation target geographical point calculated by the calculation target geographical point altitude calculation unit and the altitude at the reference geographical point calculated by the reference geographical point altitude calculation unit.

5. An on-board apparatus according to claim 4, further comprising:
an altitude information acquisition unit that obtains altitude information corresponding to two geographical points, one of which is present ahead of the calculation target geographical point and apart from the calculation target geographical point by a predetermined separating distance, the other of which is present behind the calculation target geographical point and apart from the calculation target geographical point by the separating distance, from the map data; and
a second road grade calculation unit that calculates the road grade at the calculation target geographical point based upon the altitude information obtained by the altitude information acquisition unit.

6. An on-board apparatus according to claim 5, wherein:
the on-board apparatus selects either the road grade calculation unit or the second road grade calculation unit in correspondence to a slope shape of a road segment extending between the calculation target geographical point and the reference geographical point and calculates the road grade at the calculation target geographical point by the selected unit.

* * * * *